H. A. ELMER.
STRAW CUTTER FOR THRESHING MACHINES.
APPLICATION FILED MAR. 24, 1919.
1,324,147.
Patented Dec. 9, 1919.
3 SHEETS—SHEET 2.
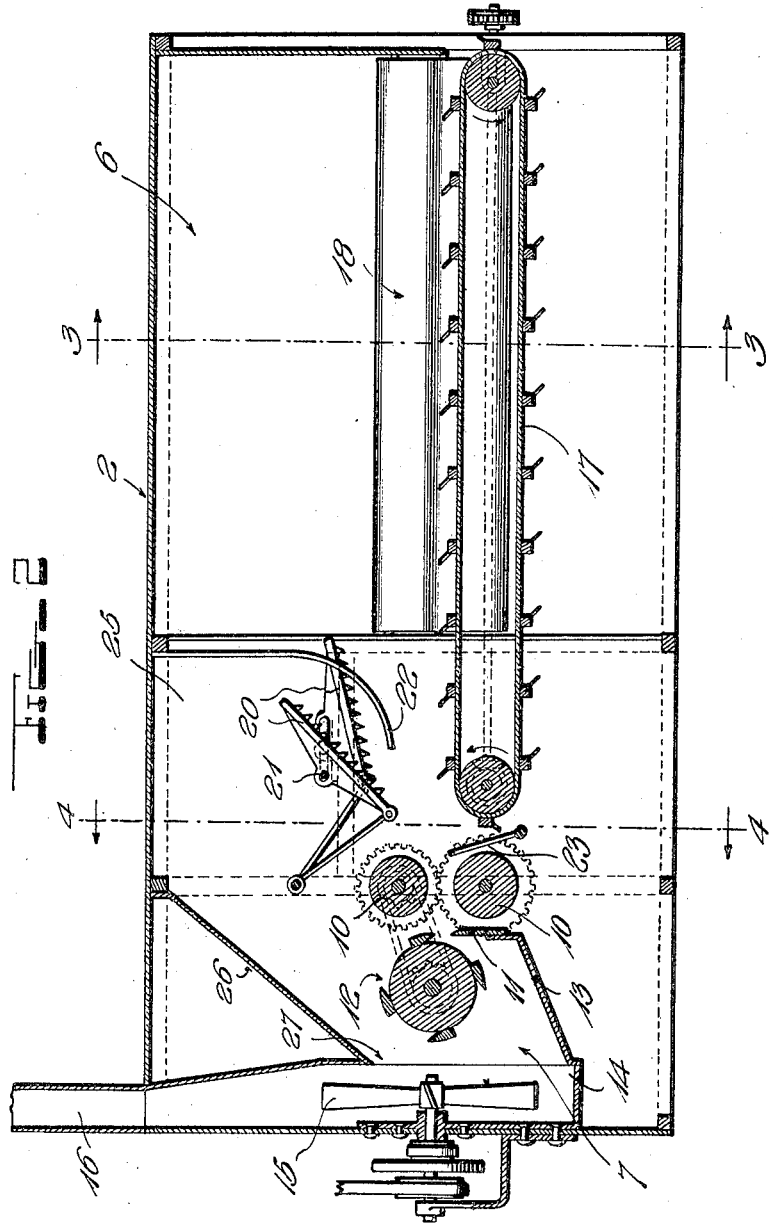
Witness
Inventor
Henry A. Elmer
By
Attorneys

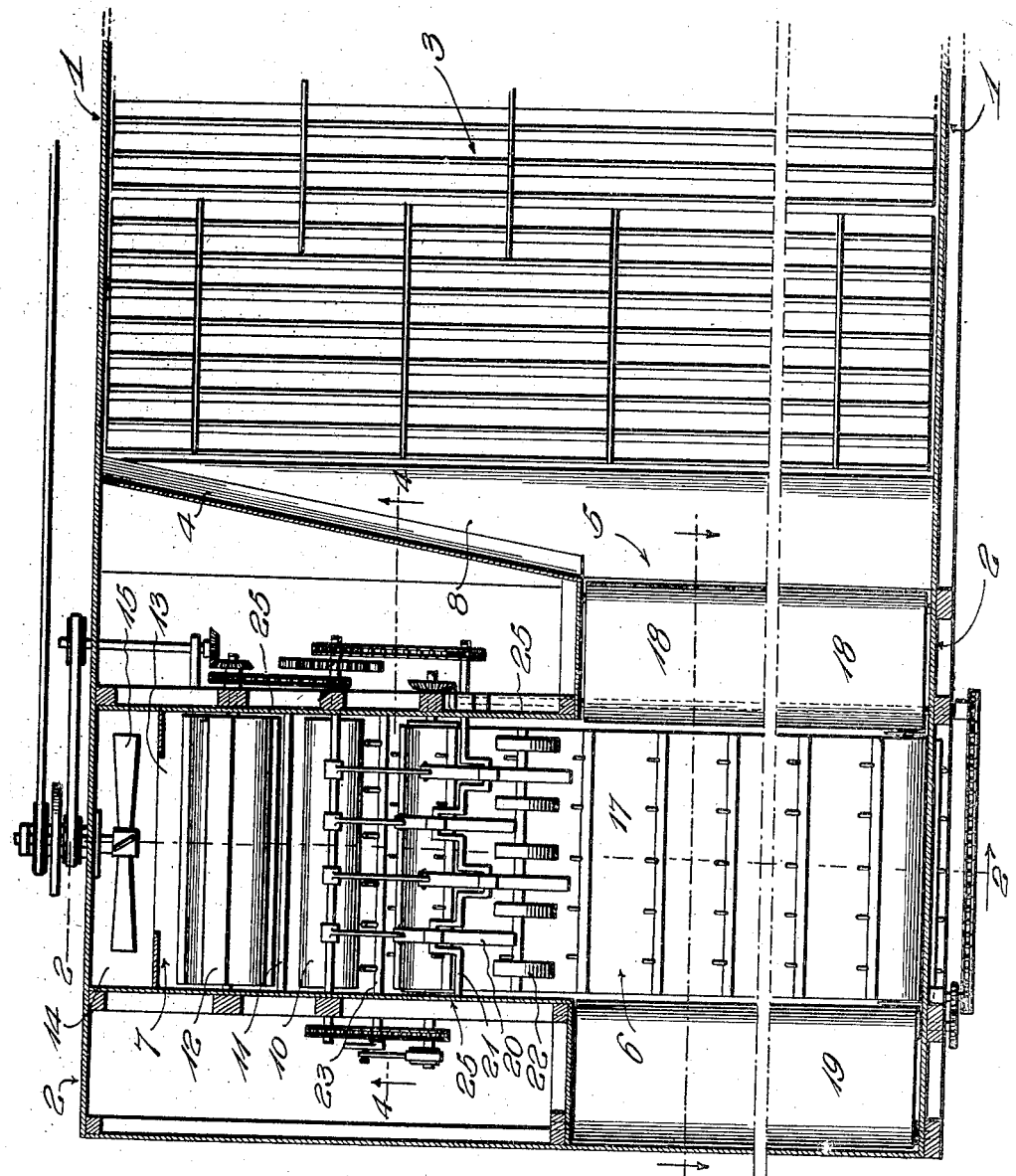

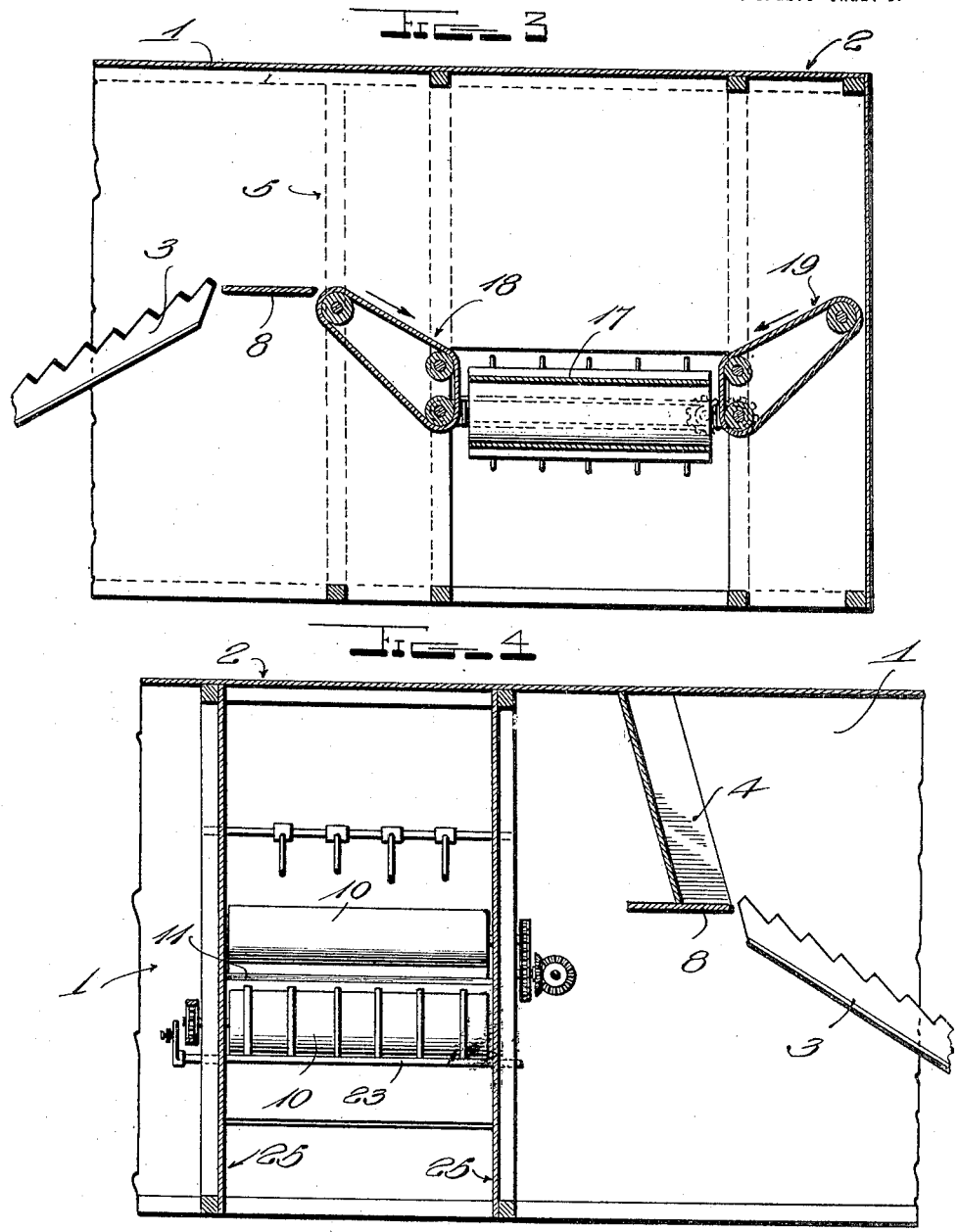

UNITED STATES PATENT OFFICE.

HENRY A. ELMER, OF MARIBEL, WISCONSIN.

STRAW-CUTTER FOR THRESHING-MACHINES.

1,324,147.   Specification of Letters Patent.   Patented Dec. 9, 1919.

Application filed March 24, 1919. Serial No. 284,549.

*To all whom it may concern:*

Be it known that I, HENRY A. ELMER, a citizen of the United States, residing at Maribel, in the county of Manitowoc and State of Wisconsin, have invented certain new and useful Improvements in Straw-Cutters for Threshing-Machines; and I do declare the following to be a full, clear, and exact description of the invention, such as will enable others skilled in the art to which it appertains to make and use the same.

My invention relates to improvements in threshing machines and more particularly to those in connection with which a chopping device is employed for cutting the straw into short lengths before it leaves the machine. It has been proposed to place chopping cylinders entirely across the threshing machine casing to receive the straw as it is discharged from the straw rack, but devices of this character have not been at all efficient, due to the fact that only a very thin sheet of straw leaves the straw rack and the straw is not of sufficient density to allow the chopping device to effectively operate thereon. My invention however aims to overcome this difficulty by providing means between the straw rack and the chopper, for narrowing the sheet of straw and consequently increasing its density before it is fed to said chopper, thereby not only producing better results, but allowing the use of a chopping device of considerably less length than those heretofore proposed.

With the foregoing in view, the invention resides in the novel construction and arrangement of parts hereinafter described and claimed, the descriptive matter being supplemented by the accompanying drawings which form a part of this application.

Figure 1 is a horizontal section of a portion of a threshing machine embodying my invention.

Fig. 2 is a vertical transverse section on the plane of the line 2—2 of Fig. 1.

Figs. 3 and 4 are longitudinal sections on the planes indicated by the lines 3—3 and 4—4 of Figs. 1 and 2.

In the drawings above briefly described, the numeral 1 designates a threshing machine casing which is extended at 2 beyond the straw rack 3, and said casing is provided with a preferably inclined and obliquely disposed partition 4 located at the discharge end of the straw rack and extending from one side of the casing 1 toward the other side thereof, terminating short of the latter, however, to provide a passage 5 through which the straw is fed from the relatively large straw rack compartment 6 into the comparatively small, transverse, chopping compartment 7 which is provided in the extended end 2 of the casing 1. The partition 4 preferably rests on and is secured to a transverse board 8 which prevents the straw from dropping between the partition and straw rack. In the end of the transverse compartment 7, remote from the passage 5, is a straw chopping and discharging mechanism, and suitable conveyers are provided in said compartment to carry the straw to said chopping mechanism from the passage 5, whereby such straw will be chopped as required and then delivered to the discharge means so that it will be in proper form for bedding or feed when blown out of the machine by a fan, or otherwise discharged.

The chopping mechanism consists of a pair of driven rollers 10, a fixed knife 11 adjacent said rollers, and a rotary cutter 12 coacting with said knife. The straw is fed between the rollers 10, the latter compress it into a flat sheet and it is chopped by the rotary cutter 12 and the knife 11 into the proper lengths, being then discharged by means of a suitable chute or the like 13 into a fan box 14 in which is provided a driven fan 15 for discharging the chopped straw through the stacking pipe 16. A transverse conveyer 17 operates longitudinally in the compartment 7 to carry the straw to the rollers 10 and an inclined conveyer 18 moving transversely of said compartment, is employed to carry the straw from the board 8 onto said conveyer 17. In most instances, a second conveyer 19 will be provided opposite the conveyer 18 to insure that the straw as it is abundantly fed through the passage 5, shall be properly deposited upon the conveyer 17.

Raker arms 20 of well known formation are mounted above the delivery end of the conveyer 17 and are actuated by a crank shaft or the like 21 between curved spring fingers 22, to insure proper feeding of the straw from the conveyer 17 between the rollers 10; and this feeding may be facilitated by an oscillating feeder 23 located between the delivery end of the conveyer and the lower roller 10.

The feeding means 20—21—22 and the chopping means 10—11—12, are preferably housed between suitable walls 25 of sheet metal or the like, which will prevent the straw from falling to the sides of such mechanisms instead of being properly discharged into the chute 13; and it will be understood that said walls guide the chopped material to said chute. An inclined plate 26 may well extend from the top of the compartment 7 to the inlet 27 of the fan box 14 to further insure proper entrance of the chopped straw into said fan box.

Any preferred driving means may be provided for the several moving parts of the machine and since such driving connections are adequately illustrated, they need not be described in detail, but it may be set forth that I drive all parts from the source of power used to operate the threshing machine, and that the threshing and chopping operations are successively performed, all straw being chopped as required as it leaves the straw rack 3, the straw being carried by the conveyers to the chopping means, fed into the fan box 15 after chopping, and discharged by the fan 15 through the stacking pipe 16. Although this form of pneumatic stacker is by preference employed, it will be understood that any other preferred discharge means could well be provided for the straw. By providing the partition 4 and the outlet 5, the thin sheet of straw is narrowed as it leaves the straw rack 3 and is thus greatly increased in density and in this condensed form it is fed to the chopping mechanism. This mechanism may operate upon the condensed or compressed mass of straw much more effectively than is possible where only a thin sheet is fed to the chopping means as in machines heretofore proposed.

From the foregoing taken in connection with the accompanying drawings it will be seen that I have provided an extremely simple and inexpensive arrangement for carrying out the object of the invention; and since probably the best results are obtained from the details disclosed, they may well be followed, but within the scope of the invention as claimed considerable latitude is allowed for making such changes as occasion may dictate.

I claim:

A machine of the class described comprising a casing provided with parallel vertical sides and with a vertical end wall at right angles to said sides, a straw rack in said casing with its delivery end terminating in spaced relation with said end wall, a transverse partition in said casing at said delivery end of the straw rack extending from one of said side walls toward the opposite wall and terminating in spaced relation with the latter, leaving a restricted outlet opening through which the straw from said straw rack discharges, the space between said end wall and said partition forming a relatively long narrow transverse compartment, straw chopping means in said compartment, said partition extending obliquely to the aforesaid straw outlet opening for narrowing and condensing the thin sheet of straw discharged from the rack before passage thereof through said opening to said straw chopping means, said partition extending vertically from said straw rack to the top of said casing, and a horizontal support occupying the space between said straw rack and the lower edge of said partition, said support extending beyond said partition to the opposite side wall of the casing and dividing the lower side of said straw outlet opening.

In testimony whereof I have hereunto set my hand.

HENRY A. ELMER.

Witnesses:
  NICK LEIBENBANN,
  GUSTAV SCHLEY.